Patented Oct. 9, 1951

2,570,582

UNITED STATES PATENT OFFICE 2,570,582

PROCESS FOR THE PREPARATION OF 7-HYDROXY-1:2-DIALKYL-HYDROPHENAN-THRENE-2-CARBOXYLIC ACIDS

Karl Miescher, Riehen, and Jules Heer, Basel, Switzerland, assignors to Ciba Pharmaceutical Products, Inc., Summit, N. J.

No Drawing. Application January 27, 1948, Serial No. 4,704. In Switzerland January 31, 1947

3 Claims. (Cl. 260—520)

The present invention relates to a process for the preparation of therapeutically active 7-hydroxy - 1:2 - dialkyl - hydrophenanthrene - 2 - carboxylic acids. More specifically, the invention has especial relation to the preparation of the said active compounds from therapeutically inactive diastereoisomers thereof.

It is known that in the production of 7-hydroxy - 1:2 - dialkyl - hydrophenanthrene - 2 - carboxylic acids, or derivatives thereof, mixtures of active and inactive diastereoisomers are obtained.

According to the present invention, the therapeutically inactive diastereoisomers of the 7-hydroxy - 1:2 - dialkyl - hydrophenanthrene - 2 - carboxylic acids, or derivatives thereof, can be converted into the therapeutically active diastereoisomeric form by heating the same to elevated temperature with an inorganic base. Temperatures ranging from 200° C. to 300° C. are especially suitable.

As starting materials, use may be made of, for example, the inactive diastereoisomeric forms of 7-hydroxy-1-ethyl-2-methyl- or 7-hydroxy-1:2-dimethyl- or 7-hydroxy-1-propyl-2-methyl-1:2:3:4 - tetrahydrophenanthrene - 2 - carboxylic acids. Instead of the 7-hydroxy-1:2-dialkyl-1:2:3:4 - tetrahydrophenanthrene - 2 - carboxylic acids, there may be used derivatives thereof, for example esters, ester-ethers or ethers, which are converted by hydrolysis during the reaction into the said acids. In this case, a free carboxyl or hydroxyl group is formed during the reaction.

As inorganic bases there are used, for example, alkali metal hydroxides or alkaline earth metal hydroxides, such as sodium hydroxide, potassium hydroxide, lithium hydroxide or calcium hydroxide. The reaction may be carried out in an open vessel or under pressure in the presence of a diluent, such as water or an alcohol.

By the process of the invention a considerable increase in the quantity of the therapeutically active acids is brought about. If desired, inactive constituents which are still present may be separated by known methods and again subjected to the treatment of the invention.

It is intended to use the products of the invention as medicaments or as intermediate products for making medicaments.

The following examples illustrate the invention, the parts being by weight unless otherwise stated, and the relationship of parts by weight to parts by volume being the same as that of the gram to the cubic centimetre:

Example 1

0.5 part of therapeutically inactive 7-hydroxy-1 - ethyl - 2 - methyl - 1:2:3:4 - tetrahydrophenanthrene-2-carboxylic acid melting at 238–240° C. is heated in a mixture of 25 parts of potassium hydroxide and 3 parts by volume of water in a nickel crucible in an atmosphere of nitrogen for 1¼ hours at a bath temperature of 290–300° C. After cooling, the melt is dissolved in water, mixed with an excess of hydrochloric acid, and the precipitated acid is taken up in ether. After evaporating the solvent 0.5 part of an acid is obtained which consists of a mixture of the active and inactive compound. For the purpose of separation, the mixture is dissolved in 1 part by volume of a saturated aqueous solution of sodium carbonate and 10 parts by volume of water, and carbon dioxide gas is passed into the solution. In this manner 0.25–0.3 part of the original acid is precipitated. By filtering and acidifying the filtrate there is obtained 0.2–0.25 part of therapeutically active 7-hydroxy-1 - ethyl - 2 - methyl - 1:2:3:4-tetrahydrophenanthrene-2-carboxylic acid, which after recrystallisation from ethyl acetate melts at 204° C.

The reaction may also be carried out in aqueous alkaline solution by heating for a short time in a closed tube.

Example 2

1 part of therapeutically inactive 7-hydroxy-1:2-diethyl - 1:2:3:4 - tetrahydrophenanthrene-2-carboxylic acid melting at 264–266° C. is heated in a mixture of 50 parts of potassium hydroxide and 7 parts by volume of water for 1¼ hours, the bath temperature being 300° C. The product is worked up in the manner described in Example 1. The resulting mixture of acids is subjected to separation by dissolution in 2 parts by volume of a saturated aqueous solution of sodium carbonate and 30 parts by volume of water and treatment with carbon dioxide gas. In a short time the unchanged starting material precipitates. After filtration the filtrate is acidified with hydrochloric acid, whereby the therapeutically active 7-hydroxy-1:2-diethyl-1:2:3:4-tetrahydrophenanthrene-2-carboxylic acid is precipitated. After recrystallisation from methanol it melts at 191–193° C.

The starting compound may contain a methyl or propyl group in lieu of ethyl in the 1-position and an ethyl or propyl group in lieu of the methyl in the 2-position.

*Example 3*

1 part of therapeutically inactive 7-hydroxy-1-ethyl - 2 - methyl - 1:2:3:4-tetrahydrophenanthrene-2-carboxylic acid methyl ester is heated for 1½ hours at 280° C. in a sodium hydroxide melt prepared with 40 parts of sodium hydroxide and 5 parts by volume of water. Hydrolysis of the esterified carboxyl group takes place simultaneously. The working up of the product and also the separation of the resulting mixture is carried out in the manner described in Examples 1 and 2. In this manner 0.5 part of the therapeutically inactive 7-hydroxy-1-ethyl-2-methyl-1:2:3:4 - tetrahydrophenanthrene - 2-carboxylic acid melting at 238–240° C. corresponding to the starting material, and 0.4 part of the therapeutically active diastereoisomeric acid melting at 204° C., are obtained.

In the same manner the inactive 7-acetoxy-1-ethyl - 2 - methyl - 1:2:3:4-tetrahydrophenanthrene-2-carboxylic acid methyl ester and the inactive 7-methoxy-1-ethyl-2-methyl-1:2:3:4-tetrahydrophenanthrene-2-carboxylic acid methyl ester are converted into the active 7-hydroxy-1-ethyl - 2 - methyl - 1:2:3:4-tetrahydrophenanthrene-2-carboxylic acid.

Having thus described the invention, what is claimed is:

1. A process for the preparation of a therapeutically active 7-hydroxy-1:2-dialkyl-hydrophenanthrene-2-carboxylic acid, which comprises heating a therapeutically inactive 7-R-2-R'-1:2-dialkyl-hydrophenanthrene, wherein R represents a member selected from the group consisting of hydroxy, lower acyloxy and lower alkoxy, and R' represents a member selected from the group consisting of carboxy and lower carbalkoxy, to a temperature of 200–300° C. with an alkali metal hydroxide.

2. A process for the preparation of the therapeutically active 7-hydroxy-1-ethyl-2-methyl-1:2:3:4-tetrahydrophenanthrene - 2 - carboxylic acid, which comprises heating the therapeutically inactive 7-hydroxy - 1 - ethyl - 2-methyl-1:2:3:4-tetrahydrophenanthrene-2-carboxylic acid to a temperature of 200–300° C. with an alkali metal hydroxide.

3. A process for the preparation of the therapeutically active 7-hydroxy-1-ethyl-2-methyl-1:2:3:4-tetrahydrophenanthrene - 2 - carboxylic acid, which comprises heating a therapeutically inactive 7-lower alkoxy-1 - ethyl - 2 - methyl-1:2:3:4 - tetrahydrophenanthrene-2 - carboxylic acid derivative which is hydrolyzable to the free hydroxy acid to a temperature of 200–300° C. with an alkali metal hydroxide.

KARL MIESCHER.
JULES HEER.

REFERENCES CITED

The following references are of record in the file of this patent:

UNITED STATES PATENTS

| Number | Name | Date |
|---|---|---|
| 2,377,390 | Weijlard et al. | June 5, 1945 |

OTHER REFERENCES

Campbell et al.: J. Am. Chem. Soc., vol. 54, pp. 4581–4585 (1932).

Gilman: "Organic Chemistry" (Wiley), vol. 1, p. 176 (1938).

Ives et al.: J. Chem. Soc. (London), 1938 pp. 1455–1458 (1939).

Stiller et al.: J. Am. Chem. Soc., vol. 62, p. 1786 (1940).

Perkin and Kipping: "Organic Chemistry" (3rd Ed. Crowell), pp. 675–677 (1941).